United States Patent [19]

McClellan et al.

[11] Patent Number: 4,926,393

[45] Date of Patent: May 15, 1990

[54] MULTIFOLD VERTICAL SEISMIC PROFILE ACQUISITION METHOD AND TECHNIQUE FOR IMAGING THE FLANK OF A SALT DOME

[75] Inventors: Bruce D. McClellan; Olan T. Adams, both of Katy, Tex.; Vernon D. Cox, Ponca City, Okla.

[73] Assignee: Conoco Inc., Ponca City, Okla.

[21] Appl. No.: 300,001

[22] Filed: Jan. 23, 1989

[51] Int. Cl.$^5$ .............................................. G01V 1/28
[52] U.S. Cl. ...................................................... 367/57
[58] Field of Search ....................... 367/15, 50, 56, 57, 367/58

[56] References Cited

U.S. PATENT DOCUMENTS

| | | | |
|---|---|---|---|
| 2,021,943 | 11/1935 | McCollum | 367/57 |
| 2,718,930 | 9/1955 | Bazhaw | 367/57 |
| 3,867,713 | 2/1975 | Tegland et al. | 367/56 |
| 4,241,429 | 12/1980 | Bloomquist et al. | 367/52 |
| 4,467,460 | 8/1984 | Johnson | 367/56 |
| 4,509,149 | 4/1985 | Ruehle | 367/21 |
| 4,627,036 | 12/1986 | Wyatt | 367/57 |
| 4,800,538 | 1/1989 | Passmore et al. | 367/55 |
| 4,802,147 | 1/1989 | Moeckel | 367/57 |

*Primary Examiner*—Thomas H. Tarcza
*Assistant Examiner*—Ian J. Lobo

[57] ABSTRACT

A seismic layout technique and a processing technique for providing better data acquisition relative to salt domes which utilizes a line of sources in a selected pattern opposite a salt flank from a well bore, and a plurality of spaced receivers are disposed along the well bore for coaction with energy from said plural source location to record an array of multi-fold data. The data is then processed to establish a pseudo-source point along the well bore in relation to each of the receiver points to enable subsequent CDP processing of the data thereby to establish a vertical common reflection point outline of the vertical flank of the salt dome.

21 Claims, 2 Drawing Sheets

MULTIFOLD VERTICAL SEISMIC PROFILE ACQUISITION METHOD AND TECHNIQUE FOR IMAGING THE FLANK OF A SALT DOME

BACKGROUND OF THE INVENTION

1. Field of the Invention

The present invention relates to acquiring seismic acoustic data and more particularly to acquiring and processing multifold vertical seismic profile data in order to accurately image vertical interfaces, such as the flank of a salt dome.

2. Related Prior Art

Prior art has produced several methods that attempt to image the flank of a steeply dipping interface, such as that of a salt dome. However, there are serious limitations in the practical effectiveness of these techniques (i.e. a good salt flank image is rare).

Currently, vertical seismic profile (VSP) imaging of a salt flank is accomplished using either an offset geometry (single source, many receivers) or a walkby geometry (multiple sources, few receivers). The data is processed using a ray tracing Vertical Seismic Profile to Common Depth Point (VSP-CDP) transformation or using a special migration program. Both techniques require a detailed geologic model to accomplish the processing.

In addition, some methods to image nearly vertical interfaces require the use of both downhole sources and receivers when imaging vertical or nearly vertical interfaces. When sources and receivers are used together with multifold processing techniques, both sources and receivers may be located on the surface (conventional seismic data acquisition), or the source may be located on the surface and the receiver may be located below the surface in a wellbore (vertical seismic profile), or both the source and receiver may be located below the surface. Some examples are contained in U.S. Pat. Nos. 2,718,930 (Bazhaw), 4,627,036 (Wvatt) and 4,509,149 (Ruehle).

U.S. Pat. No. 2,718,930 titled "Method of Deep Well Surveying" (Bazhaw) outlines a borehole seismic technique designed to help delineate the flanks of a salt dome, reef or other nearly vertical reflector or interface. A string of geophone receivers is laid out within the borehole, and a seismic source is employed in the borehole adjacent the vertical seismometer spread. The seismic waves move laterally from the borehole to the salt and back to the receivers, imaging the salt surface.

U.S. Pat. No. 4,627,036 titled "Vertical Seismic Profiling" (Wvatt) relates to a technique in which vertical seismic profile data is transformed into surface seismic data by mapping segments of the VSP seismic data into surface seismic data time configuration. The transformation results in data which is more easily interpreted with respect to determining subsurface structure because the data is stacked and because the data is in a more conventional form. This technique transforms conventional Vertical Seismic Profile (VSP) data, acquired using a long offset source, into the equivalent of surface seismic data. A very large offset is required for this method to operate accurately. By mapping VSP data into equivalent surface seismic data, the multifold common-depth-point (CDP) procedure may be used to enhance data quality. This manipulation is often referred to as the VSPCDP stack.

U.S. Pat. No. 4,509,149 titled "Directional Long Array for Logging Vertical Boundaries" (Ruehle) relates to a logging sonde that has directivity control of multiple sources and receivers in linear arrays. Each of the sources produces acoustic pulses which are delayed by a time delay between the sources to direct acoustic energy at an angle such that the resulting acoustic wave strikes a vertical formation orthogonally. The reflections of the acoustic pulses are detected with a linear array of receivers. The acoustic pulse detected by each receiver is delayed by an amount such that the total differential moveout for a reflected directional wave is zero.

Methods which are demonstrative of multifold processing techniques which are currently in use in the art are U.S. Pat. Nos. 3,867,713 (Teoland et al.), 4,241,429 (Bloomquist et al.) and 4,467,460 (Johnson). U.S. Pat. No. 3,867,713 titled "Multifold Seismic Exploration Over Purposefully Crooked Traverses" (Teoland et al.) relates to a processing technique in which seismic impulses are generated successively at locations uniformly spaced along traverse segments which regularly cross a median line. The segments are of a length equal to an integral multiple of the spacing between the locations. Seismic waves resulting from each impulse are detected at a set of the locations. This set of locations bears the identical traverse relationship to its shot point where the impulse giving rise to the detected waves is generated as every other set of locations bears to its shot point. Preferably, the detected signals are stacked on a common depth point basis to portray regularly patterned multifold a real subsurface structure.

U.S. Pat. No. 4,241,429 titled "Velocity Determination and Stacking Process from Seismic Exploration of Three Dimensional Reflection Geometry" (Bloomquist et al.) relates to a method in which linear, multiple fold, common depth point sets of seismograms with three dimensional reflection geometry are used to determine the dip and strike of the subsurface reflecting interfaces and the average velocity of the path of the seismic energy to the reflecting interface. The reflections in each set appear with time differences on a hyperbola with trace spacings determined by the source receiver coordinate distance along the lines of exploration. The offset of the apex of this hyperbola is determined from a normal move-out velocity search of the type performed on two dimensional CDP sets. This search identified the correct stacking velocity and hyperbola offset which are used to determine dip, strike and average velocity.

U.S. Pat. No. 4,467,460 titled "Seismic Data Acquisition Method" (Johnson) relates to a method for locating seismic acoustic pulse sources to simplify multifold processing. This method is primarily concerned with coupling that occurs in reception of acoustic pulses by geophones or other acoustic pulse receivers. The field locations of seismic shot points are chosen to produce partial multifold data, the static correction equations of which are at least partially coupled. The seismic cross sections resulting therefrom are substantially improved.

SUMMARY OF THE INVENTION

The present invention provides a method whereby the flank of a steeply dipping interface may be imaged using offset surface acoustic pulse sources and downhole acoustic receivers while still being able to take advantage of multifold processing techniques to enhance data quality. Normally, a near offset will be used when such interface is shallow and a far offset will be used when such interface is deep. In the method of the present invention, acoustic pulse sources are located on a side of the acoustic pulse receivers opposite that of the location of a steeply dipping interface, such as the flank of a salt dome. Acoustic pulses are generated and a first break time is determined when the pulses first pass the acoustic receivers on their way to the vertical interface. A total travel time is obtained when the pulses are reflected by the vertical interface and travel back to the acoustic pulse receivers. A two way travel time is calculated from a pseudo seismic source location to the receivers by subtracting the first break time from the total travel time. The data obtained on the basis of the two way travel time may then be processed as conventionally acquired seismic data.

DESCRIPTION OF THE PREFERRED EMBODIMENT

Figure 1:
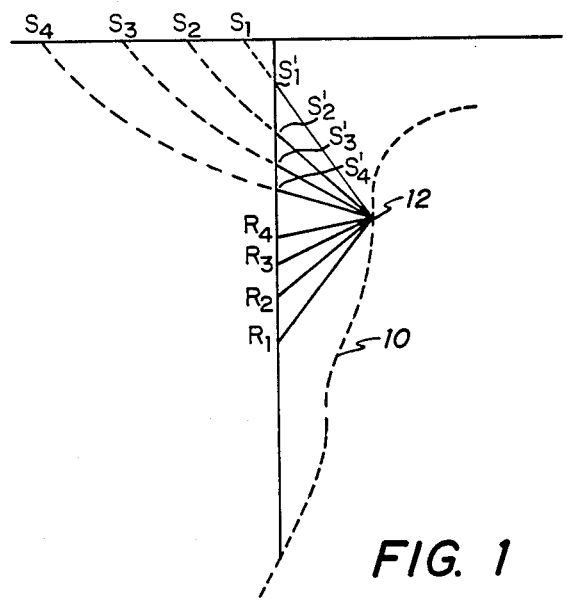
FIG. 1 is a representation of seismic data acquisition system.

The present invention provides a new vertical seismic profile (VSP) acquisition geometry and processing technique which will image the flank of a steeply dipping or nearly vertical formation such as flank of a salt dome.

The acquisition geometry and processing technique of the present invention requires no initial geologic model for processing and, in fact, gives a first estimate of the geologic model required for the usual processing. The unique orientation of the resulting common midpoint gather, along with the high source/receiver multiplicity, results in a seismic image of the salt face that is superior to that obtainable from currently available vertical seismic profile technology.

The method of the present invention may be used either on land or offshore. However, the process of the present invention is particularly described with respect to a marine endeavor utilizing a source boat to emphasize its effectiveness. In marine data acquisition, the seismic sources may be moved to a plurality of locations, easily providing a plurality of shot points for each position in a well at which a receiver or receivers may be located. A seismic boat without a seismic streamer occupies many source locations while, for example, a three-component receiver is stationary at one depth in the well. The sources are occupied in a line or pattern opposite the salt flank from the well. At a speed, such as twelve knots, forty-eight source points could be spread over one mile (with six seconds listening time) in less than five minutes, the time currently spent at each VSP level. Slower source boats may lead to fewer source locations per traverse, or a longer recording time per receiver level. The technique could be applied onshore using more than one seismic source.

The seismic boat may generate acoustic pulses at many source locations and may be repeated for many receiver depth locations from the bottom of the well to near the top of the well. As the receiver is moved up to the next successive level, the source boat can simply turn one hundred eighty degrees and shoot in the direction from which it came. Source positions can be binned, as is currently done for 3-D (three dimensional) seismic shooting.

The data acquired by this method is edited, filtered, deconvolved and the upgoing and downgoing wavefields are separated. First break times for each of the source-receiver combinations are selected.

A trace may be associated with each combination of sources and receivers. With each source-receiver combination, the following steps may be performed.

A source-receiver combination which has the same source location but a receiver location which is shallower or at the same level is identified from other traces to provide a first break time. A new trace may be created for the present source-receiver trace. This new trace is the given trace with the first break travel time for the source-receiver combination, found above from the other traces, subtracted. The new trace is associated with an offset which is the distance between the two receiver locations. A basement is determined for this trace which is the midpoint between the two receiver locations. The new trace may then be output and displayed. These steps may be repeated for all source-receiver combinations that has the same source location but a receiver location that is shallower or at the same level.

Finally, these same steps may be repeated for every source receiver combination that has a different source location. The resulting traces may now be processed as an ordinary seismic line, i.e., perform statics, velocity analysis, normal moveout (NMO), stacking, migration etc..

Using the new geometry, each reflection point is sampled at several offsets. The increased redundancy provided by the multiple offsets improves the quality of the imaging of the reflectors. The transformation from the VSP geometry to the CDP geometry does not o require a detailed geological model. In contrast to other methods, the imaging improves as the dip of the salt flank increases.

FIG. 1 shows the acquisition geometry. Four source locations are marked $S_1$ through $S_4$ and four receiver locations are marked $R_1$ through $R_4$. The raypaths are illustrated as curved due to a mild vertical velocity gradient. As a ray travels from a source $S_1$ to salt flank 10 and reflects to a receiver $R_1$, it passes through the well bore at $S_1'$ (. Thus, the point Si serves as an equivalent source location. As position $S_1'$ will be occupied by a receiver at some time in the VSP survey, then the travel time from $S_1$ to $S_1'$ will be the first break time for that receiver. This first break travel time can be subtracted from the travel time for the complete path from $S_1$ through $S_1'$ to point 12 on salt flank 10 and then to $R_1$. The result is the travel path from $S_1'$ to salt flank 10 and reflected back to $R_1$ as shown by the solid line.

The resulting trace obtained by this procedure is equivalent to having a source at $S_1'$, and a receiver at $R_1$. If this procedure is followed for every trace, then the result is equivalent to having a line of sources $S_1'$ through $S_4'$ and a line of receivers $R_1$ through $R_4$ along the vertical well bore. By rotating the figure by ninety degrees (see FIG. 3), it can be seen that the geometry is the same as that of an ordinary surface seismic line with the well bore on the "surface" and the salt flank a dipping "horizontal" bed. Thus the VSP can be converted into an equivalent CDP geometry.

Figure 2:
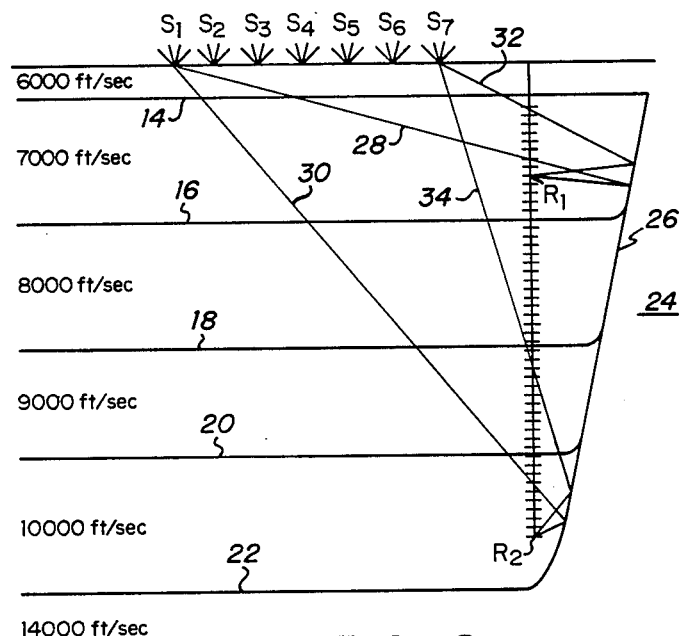
FIG. 2 is a two dimensional view of a depth model of a steeply dipping interface and a wellbore.

Referring now to FIG. 2, a depth model with which the method of the present invention may be demonstrated is illustrated. In order to test the feasibility of the acquisition and processing a synthetic model was generated using a ray trace modeling package. The model consisted of four flat layers 14, 16, 18 and 20, a salt layer 22 and a salt dome 24 with a steeply dipping flank 26 (eighty degrees). The velocities used and also some of the ray paths for salt flank 26 are identified in FIG. 2. Source $S_1$ is illustrated as having raypaths 28 and 30 reflected from flank 26 and received by receivers $R_1$ and $R_2$ respectively. Source $S_7$ is illustrated as having raypaths 32 and 34 reflected from flank 26 and received by receivers $R_1$ and $R_2$ respectively. The ray paths in the diagram are straight for convenience. The actual modeling used raypaths as determined by Snell's law at each interface.

Figure 3:
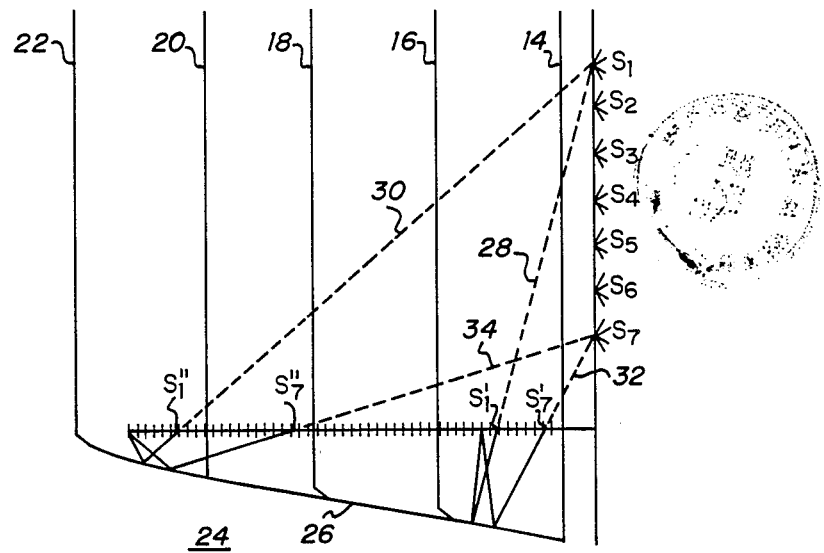
FIG. 3 is transformed view of FIG. 2 where the data acquisition line is rotated to provide a horizontal perspective.

The results of transforming the VSP geometry to the CDP geometry are illustrated in FIG. 3. Here the time required to travel the dashed portion of the ray path (i.e. a first break time) has been subtracted, leaving only the solid part of the ray paths as a two way travel time path. The dashed portions of raypaths 28 and 30 from source $S_1$ have been subtracted, making points $S_1'$ and $S_1''$ pseudo source points for the solid portions of raypaths 28 and 30 detected by receivers $R_1$ and $R_2$ respectively. Similarly, the dashed portions of raypaths 32 and 34 from source $S_7$ have been subtracted, making points $S_7'$ and $S_7''$ pseudo source points for the solid portions of raypaths 32 and 34 detected by receivers $R_1$ and $R_2$ respectively.

The correct time may be determined by first determining the geophone location where the ray path crossed the well bore on the way from the source to salt flank 26. The first break time for that location is subtracted from the time recorded by the receiving geophone. Since the location of salt flank 26 is not known, the correct first break time cannot be determined directly. In order to compensate for this unknown, all possible first break times are subtracted, and the redundancy of common depth point (CDP) stacking reduces inaccuracies which may be present. The traces that result are sorted into CDP (or common midpoint) gathers and constant velocity stack analyses are generated. After velocities were picked for several depths, the resulting velocity function was used to correct for normal moveout and produced the stack illustrated in FIG. 4.

Figure 4:
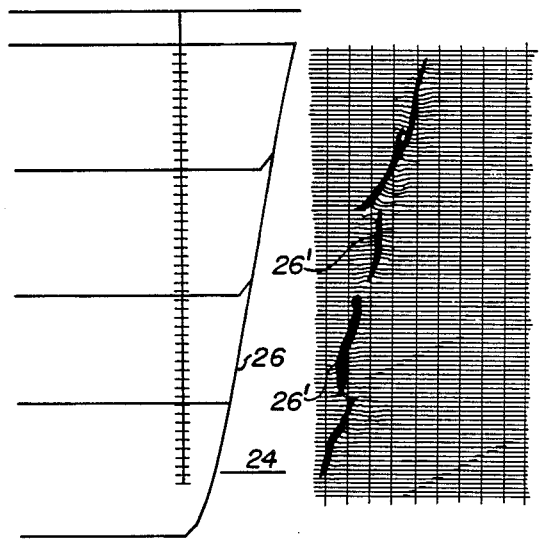
FIG. 4 is a seismogram along side the depth model of the illustration of FIG. 2.

FIG. 4 demonstrates by illustration the comparison between the model having flank 26 and the original image 26' obtained from processing the model-derived synthetic time response, as described above. The breaks in the image are due to poor velocity picks and interference between the reflections from the flat layers (which are now steep events) and the salt. Many commonly used filtering techniques may be performed to reduce the interference between the flat reflectors and the salt.

Three-component recording in the borehole is preferred to allow the data processor to enhance reflections coming from the side of the borehole and to attenuate reflections traveling subparallel to the borehole. This is analogous to the use of geophone array for reducing ground roll on surface seismic data.

It is believed that shear wave mode-conversion of the salt reflection is easier to record (of higher amplitude) than the compressional (primary) salt reflection described above. Thus, the recorded three-component data may be reprocessed using modified P wave to S wave conversion software to repeat the above technique for converted shear waves. The technique could also be applied on shore using one or more transverse shear wave sources.

While this new VSP acquisition and processing technique of the present invention has been described in terms of 2-D acquisition and processing, it can be directly extended to provide 3-D coverage. Several source lines or patterns could be acquired at each receiver level using one or more seismic sources. The same processing flow would be followed, except for the substitution of 3-D seismic processing algorithms for 2-D programs.

Further, the present invention has been described specifically in a marine environment, however, the method of the present invention may be applied to achieve similar results in land based environments. Accordingly, it is to be understood that the present invention is not limited by the preferred embodiment described, but only by the scope of the following claims.

What we claim is:

1. A method for converting vertical seismic profile data to pseudo horizontal seismic line data to image a substantially vertical interface comprising the steps of:

generating seismic acoustic pulses by a surface seismic source;

placing acoustic pulse receivers in a spaced-apart relation within a wellbore between said interface and said seismic source to receive said seismic acoustic pulses;

determining a first break time when said seismic acoustic pulses generated by said seismic source travel past said wellbore toward said interface;

receiving said seismic acoustic pulses that have been reflected from said interface to obtain a total travel time from said seismic source to said acoustic pulses receivers; and subtracting said first break time from said total travel time to isolate acoustic travel from the wellbore to the reflecting vertical interface and back to pulse receivers in said wellbore, effectively to convert said vertical seismic profile data to pseudo horizontal line data having a two way travel time.

2. The method according to claim 1 also including the step of:

processing said pseudo horizontal line data using multi-fold processing techniques.

3. The method according to claim 2 wherein said processing step includes the step of:

gathering said pseudo horizontal line data according to common depth points.

4. The method according to claim 2 wherein said processing step includes the step of:

arranging said pseudo horizontal line data according to common midpoints.

5. The method according to claim 2 wherein said processing step includes the step of:

determining an average acoustic velocity; and stacking said data.

6. The method according to claim 1 wherein said generating step includes the step of:

locating said seismic source to provide a near offset relationship.

7. The method according to claim 1 wherein said generating step includes the step of:

locating said seismic source to provide a far offset relationship.

8. The method according to claim 1 also including the steps of:

moving said acoustic pulse receivers to a second location in said wellbore; and generating seismic acoustic pulses a second time.

9. The method according to claim 8 wherein said generating step includes the step of:

locating said seismic source to provide a near offset relationship.

10. The method according to claim 8 also including the step of:

processing said pseudo horizontal line data using multifold processing techniques.

11. The method according to claim 10 wherein said processing step includes the step of:

gathering said pseudo horizontal line data according to common depth points.

12. The method according to claim 10 wherein said processing step includes the step of:

arranging said pseudo horizontal line data according to common midpoints.

13. A method for imaging the flank of a salt dome comprising the steps of:

generating periodic acoustic pulses at a plurality of locations from a moving surface seismic source;

detecting said acoustic pulses at plural seismic receivers spaced apart within a wellbore located between said surface seismic source and said salt dome;

determining first break time data signals when said acoustic pulses first arrive at said receivers;

obtaining travel time data signals from said surface seismic source to said salt dome and reflected back to said seismic receivers;

subtracting said first break time data signals from the respective travel time data signals to obtain a two way travel time signal from said wellbore to said salt dome for all generated acoustic pulses; and stacking said two way travel time data signals according to common depth point analysis.

14. The method according to claim 13 also including the steps of:

moving said seismic receivers to a second location in said wellbore; and repeating said step of generating acoustic pulses.

15. A method for imaging the flank of a salt dome comprising the steps of:

generating acoustic pulses from a surface acoustic source;

detecting said acoustic pulses in a wellbore located between said salt dome and said acoustic source and producing electric signals tin response thereto;

determining a first break time signal when said acoustic pulses pass said wellbore traveling toward said flank;

obtaining a total travel time signal for said acoustic pulses from generation to said wellbore, to said flank and as reflected back to said wellbore;

subtracting said firs break time signals from said total travel time signals to obtain electric signals representing a two way travel time between said salt dome and said wellbore; and processing said electric signals representing said two way travel time according to a multifold processing technique.

16. The method according to claim 15 wherein said processing step includes the step of:

arranging said electric signals according to common depth point gathers.

17. The method according to claim 15 wherein said processing step includes the step of:

arranging sid electric signals according to common midpoint gathers.

18. The method according to claim 16 wherein said processing step includes the step of:

determining an average acoustic velocity; and stacking said electric signals.

19. The method according to claim 17 wherein said obtaining step includes the step of:

subtracting said first break time from said total travel time.

20. The method according to claim 15 wherein said generating step includes the step of:

moving said surface acoustic source and generating acoustic pulses a second time.

21. The method according to claim 20 wherein said processing step includes the step of:

determining an average acoustic velocity; and stacking said electric signals.

* * * * *